Aug. 7, 1934.  M. H. ACKERMAN  1,968,812
APPARATUS FOR FREEZING MATERIALS AND STORING AND DISPENSING FROZEN PRODUCTS
Filed April 21, 1932  4 Sheets-Sheet 1
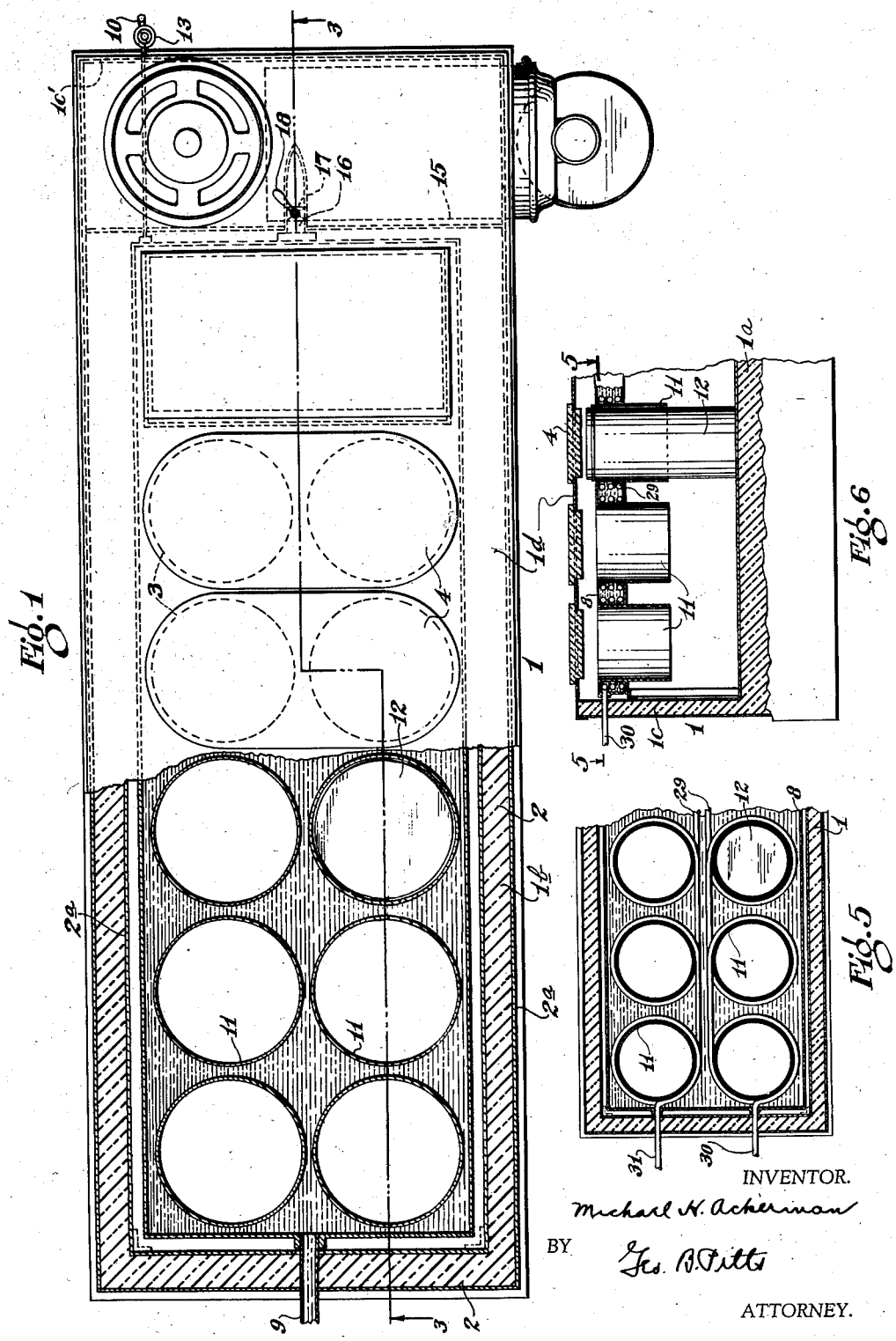

Aug. 7, 1934. M. H. ACKERMAN 1,968,812
APPARATUS FOR FREEZING MATERIALS AND STORING AND DISPENSING FROZEN PRODUCTS
Filed April 21, 1932 4 Sheets-Sheet 2
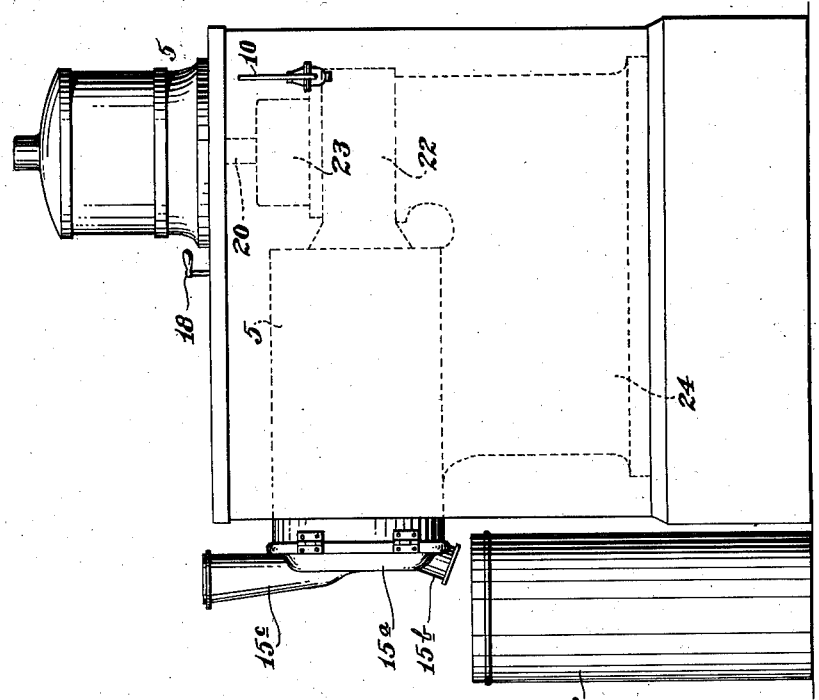
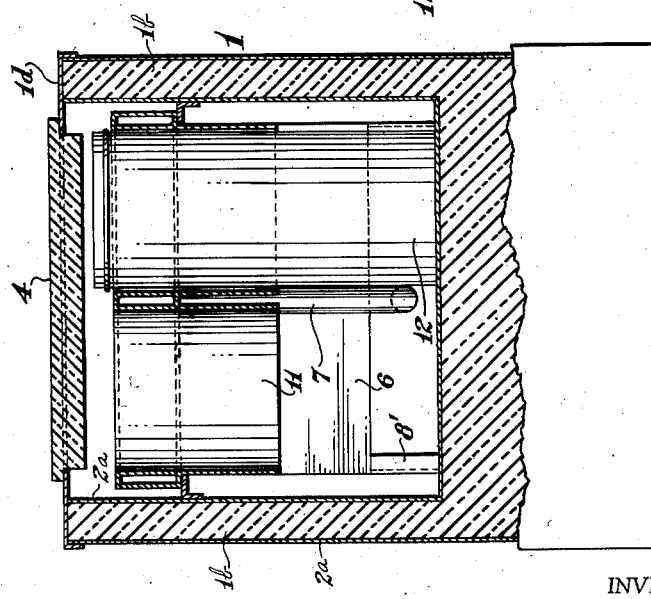
INVENTOR.
Michael H. Ackerman
BY
Geo. B. Pitts
ATTORNEY.

Aug. 7, 1934.    M. H. ACKERMAN    1,968,812
APPARATUS FOR FREEZING MATERIALS AND STORING AND DISPENSING FROZEN PRODUCTS
Filed April 21, 1932    4 Sheets-Sheet 3

INVENTOR.
Michael H. Ackerman
By
Geo. B Pitts
ATTORNEY.

Patented Aug. 7, 1934

1,968,812

UNITED STATES PATENT OFFICE 1,968,812

APPARATUS FOR FREEZING MATERIALS AND STORING AND DISPENSING FROZEN PRODUCTS

Michael H. Ackerman, Mansfield, Ohio

Application April 21, 1932, Serial No. 606,631

16 Claims. (Cl. 62—114)

This invention relates to apparatus for freezing materials to produce ice cream, ices and the like and for storing such products in the presence of a refrigerant, in an improved manner to permit ready dispensing of the products.

One object of the invention is to provide an improved unitary apparatus of this character in which frozen products may be economically maintained at desired temperatures to facilitate their dipping or dispensing.

Another object of the invention is to provide an apparatus of this character in which frozen products in containers may be stored and the temperature of the product in each container adequately controlled throughout its entire body, whereby dispensing of the product in small quantities from time to time until the container is empty, is facilitated.

Another object of the invention is to provide an improved apparatus of this character in which the refrigerant holder or circulation means are related to the upper ends of the containers for frozen products and co-operate with the cabinet walls to form a refrigerated space within the cabinet.

Another object of the invention is to provide improved apparatus of this character in which the casing or cabinet and the refrigerant holder are separable, whereby manufacture of each is effected in a simplified and economical manner and assembly and repairs may be readily made.

Another object of the invention is to provide an improved refrigerated apparatus having incorporated in it a freezing mechanism connected to the refrigerating means, whereby the refrigerant may be utilized at will for freezing materials in the freezing mechanism.

Other objects of the invention will be apparent to those skilled in the art to which my invention relates from the following description taken in connection with the accompanying drawings, wherein Fig. 1 is a plan view of an apparatus embodying my invention, parts being broken away.

Fig. 2 is an end elevation on the line 2—2 of Fig. 3.

Fig. 4 is a section on the line 4—4 of Fig. 3.

Fig. 5 is a fragmentary view on the line 5—5 of Fig. 6 showing a modified form of construction.

Fig. 6 is a fragmentary section of the form of construction shown in Fig. 5.

Figure 3:
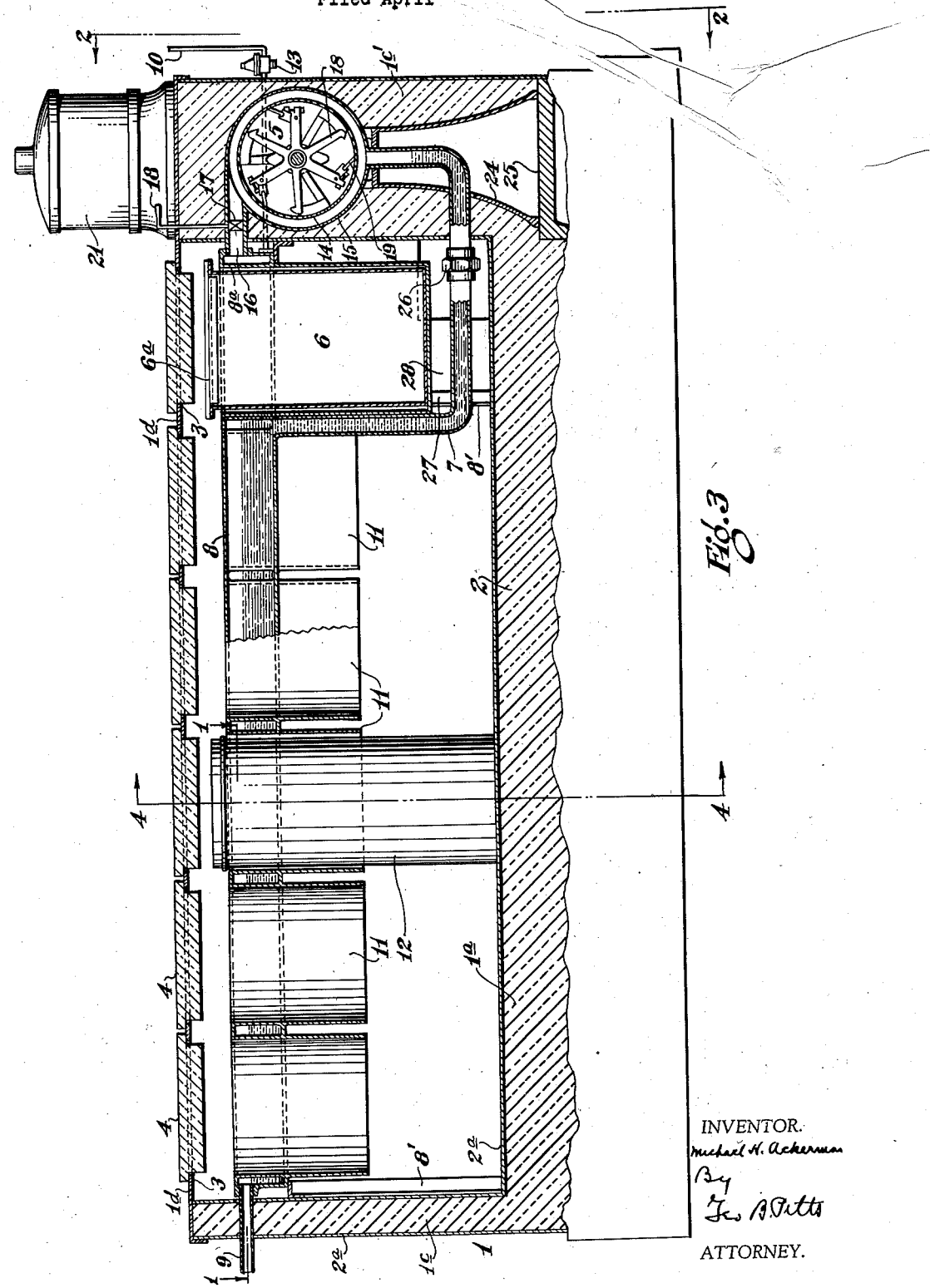
Fig. 3 is a section on the line 3—3 of Fig. 1.

In the drawings, 1 indicates as an entirety a cabinet or casing comprising a bottom wall $1a$, side walls $1b$, end walls $1c$, $1c'$ and a top $1d$. The bottom wall $1a$ and side and end walls $1b$, $1c$, $1c'$, may be constructed in any suitable manner to provide suitable insulation 2 to prevent transfer of heat through these walls. The construction of the casing 1 may consist of a skeleton frame work supporting blocks or slabs of cork or other material, that has low heat conducting characteristics, and suitable inner and outer facing material $2a$ formed from sections of sheet stock, altho the outer facing material may be formed from blocks, tiles, plates and strips where decorative color schemes are desirable. The top $1d$ may be formed from sheet material and flanged along its edges and removably secured to the walls $1b$, $1c$, in any desired manner. The top $1d$ is formed with a plurality of openings 3, each of which is closed by a cover 4. Each cover 4 may consist of a single member or a plurality of hinged together members and one or more of these members may be provided with handles.

The end wall $1c'$ is relatively thick and has incorporated in it a freezing mechanism, indicated as an entirety at 5, to which reference will later be made, such mechanism being surrounded by the insulation 2 for the end wall for well known reasons.

6 indicates a holder for a supply of the "mix" to be frozen in the freezing mechanism, when desired. The holder 6 is arranged adjacent the end wall $1c'$ and may be removed upon the removal of the top $1d$. Where the holder 6 is smaller than the opening 3 above it, it may be removed independently of the top. The holder 6 is provided with a bottom disposed in spaced relation to the bottom $1a$ to provide a space through which a conduit 7 extends. The purpose of the conduit 7 will later appear.

8 indicates a circulation means for the refrigerant removably fitting within the casing 1 and supported therein by legs $8'$ in an elevated position above the bottom wall $1a$. In the form of construction shown in Figs. 1, 2, 3 and 4, the circulation means consists of a manifold preferably having a width substantially equal to the interior width of the casing and a length substantially equal to the distance between the end walls $1c$, $1c'$. The manifold 8 is adapted to hold brine or liquid ammonia. When ammonia is used, it is supplied thereto in any desired manner to replace that which is transformed into gas or vapor and carried away in the latter form through a suction pipe 9 to the intake side of a suitable compressor (not shown). The pipe 9 may be provided with a back pressure valve. When brine is used, it is supplied under pressure through an inlet pipe 10 and discharged through the outlet 9.

The manifold 8 is formed of sheet metal and consists of a bottom, top, side walls and end walls, forming a closed chamber, the outlet pipe 9 being preferably connected to one end wall of the manifold and the supply pipe 10 being preferably connected to the other end wall. The pipes 9, 10, are screw-threaded into hollow bosses provided on the end walls of the manifold 8 and extend through openings formed in end walls 1c, 1c'.

11 indicates receivers for containers 12 which hold the frozen products, such as ice cream and ices, to be dispensed, only one container being shown in position in a receiver 11. The receivers extend through openings formed in the top and bottom of the manifold 8, the walls of the receivers and openings being suitably welded together to seal the manifold against leakage. The manifold is also formed with an opening 8a through it to accommodate the holder 6. The holder 6 is preferably provided with a lid 6a. Each receiver 11 consists of a cylinder slightly larger than a container 12. The upper end of the receiver preferably terminates flush with the top of the manifold 8, but the lower end thereof extends downwardly below the bottom wall of the manifold 8 to form a heat conductor in concentric spaced relation to the container 12. As shown, the heat conducting portions of the receivers terminate at a point remote from the bottom wall 1a. Due to the fact that it is desired to refrigerate the entire space within the casing, the walls of the manifold and receivers are formed of material having a high heat conductivity. The containers 12 rest on the bottom wall 1a, and extend through the receivers 11 to a point slightly above the manifold 8, so that a suitable tool or handle may be applied to the open end of the container 12 to facilitate its positioning in one of the receivers and its removal therefrom.

In the preferred arrangement, I provide receivers 11 in side by side relation throughout that portion of the manifold 8 between the opening 8a and end wall 1c.

The supply of ammonia through the pipe 10 is controlled to maintain a substantially predetermined amount of liquid ammonia or other refrigerant in the manifold, and this ammonia being in contact with the walls of the receivers 11 serves to absorb heat therefrom, the resulting generated gases or vapor being sucked out through the outlet 9. The supply means may consist of a valve controlling the flow of the ammonia through the pipe 10 into the manifold, the operation of the valve being effected by a float in the manifold; such means may also consist of a chamber mounted on the outer side of the wall 1c' and having a valved controlled inlet connected to the pipe 10 and an outlet leading to the manifold, the valve of the inlet being controlled by a float, but preferably the supply means consists of an expansion valve 13 that is manually controlled.

My construction and arrangement of manifold having depending heat conducting walls are advantageous as it overcomes the objection of non-uniform freezing of the frozen products in the containers 12, and freezing thereof to such temperature that dipping is impossible or too laborious. In this connection it will be noted that the refrigerant is in contact with the upper portions only of the walls of the receivers and such walls extend downwardly a relatively short distance so as to form a conducting wall for the heat. As a result of this arrangement the frozen product in the bottom or lower portion of each container is not reduced in temperature or hardened to such a degree that it cannot be dipped and served, but that through conduction of the heat through the body of the product its entire mass is kept at a suitable temperature to permit ready dipping and serving for consumption.

In the preferred arrangement, the top of the manifold is substantially in the plane of the upper end of the containers and extends downwardly approximately a distance of four inches and the conducting walls extend downwardly to a point approximately mid-way between the top and bottom of each container, so that the lower half of each container is exposed to the refrigerated atmosphere in the casing. As the lower ends of the receivers are open and no insulated walls are provided between them or below the manifold 8, it will be seen that all of the containers in the receivers are subjected to the same degree of temperature. In this arrangement, heat absorption takes place only at or adjacent to the upper end of each container, where the material is affected by room temperature when dipping thereof takes place. The conducting walls of the receivers may be extended downwardly any desired distance. The length of these walls may be varied according to the temperature desired for the frozen products in the containers or upon whether the refrigerant used has a high or low boiling point.

Of the freezing mechanism 5, 14 indicates an inner cylinder into which a predetermined quantity of "mix" is introduced to be frozen. 15 indicates an outer cylinder surrounding the cylinder 14 and forming between them a space or chamber for the liquid ammonia. The rear ends of the cylinders 14, 15, are closed in a liquid tight manner by a rear head. At the front end the refrigerant chamber is closed in a liquid and gas tight manner by a ring and the inner cylinder is closed by a head indicated at 15a, preferably hinged on the ring. The head 15a is provided with a valved discharge outlet 15b and an inlet having a funnel 15c. The bottom of the cylinder 15 is connected to the conduit 7 which leads from the bottom of the manifold 8. 16 indicates a conduit leading from the upper portion of the cylinder 15 to the manifold 8 above the level of the ammonia therein. 17 indicates a valve in the conduit 16, controlled by a handle 18. When the valve 17 is opened, the ammonia will rise into the refrigerant chamber between the cylinders 14, 15, and serve to absorb heat from the material in the cylinder 14. The resulting gases will flow through the conduit 16 into the manifold 8 and be drawn through the outlet pipe 9. When the valve 17 is closed, the gas generated in the refrigerant chamber will force the remaining liquid ammonia out of the chamber into the conduit 7, the surplus being returned to the manifold. The "mix" is introduced into the cylinder through the funnel 15c and is agitated by mechanism 18. The mechanism 18 preferably comprises inner and outer, oppositely rotatable members, the outer members carrying scrapers 19. The rotatable members of the agitating members are connected to concentrically arranged shafts which extend through the rear head and carry gears in mesh with a master gear fixed to a shaft 20. The shaft 20 is driven by a motor 21 mounted on the top 1d. The gears are mounted in casings 22, 23. The cylinders 14, 15, and gear casings are suitably mounted on a base 24, which is secured to a pad 25 forming a part of the casing 1.

The pipe or conduit 7 consists of two sections connected by a union 26, to permit assembly and removal of the manifold 8. To permit access to the union 26, one side wall 1b is provided with an opening 27 adapted to be closed by a door 28.

The containers 12 preferably comprise standard sized cans adapted to receive the frozen material as it is discharged from the freezing cylinder, as shown in Fig. 2. Each container may be provided with a cover (not shown) and when desired the cover may be applied to the container after it is positioned in a receiver.

When brine is used as a refrigerant, the pipe or conduit 17 is connected to the supply pipe 10, so that the brine may flow through the refrigerant chamber of the freezing mechanism before entering the manifold.

From the foregoing description it will be seen that a single refrigerant supply is provided for maintaining the stored products at the proper temperature and for effecting freezing of a batch of "mix" at will.

It will also be seen that as the manifold is mounted in the plane of the container tops and occupies the spaces between the containers, that it forms a top for the cabinet to close the space therein. Also, since the manifold contains the refrigerant, the generated air convection currents flow downwardly to refrigerate this space.

Figs. 5 and 6 show a modification in which the frozen products are refrigerated indirectly. In this arrangement the manifold 8 is filled with brine and the ammonia is circulated through the pipe 29, which is coiled around each receiver 11 in the manifold, the ammonia being supplied by inlet connection 30 and discharged by the connection 31, leading to a compressor.

Figure 7:
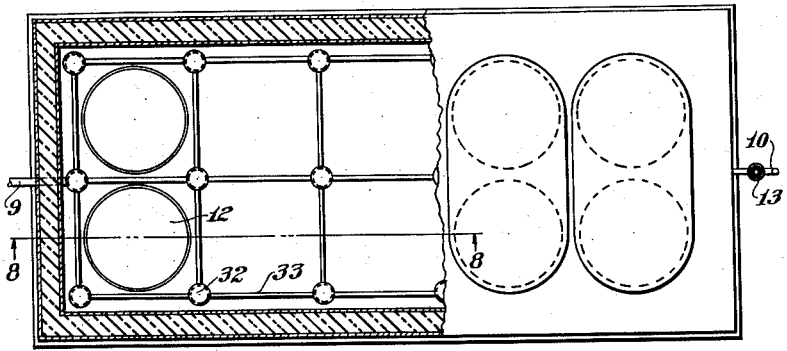
Fig. 7 is a plan view of an apparatus embodying my invention but of modified form, partly on the line 7—7 of Fig. 8.
Figure 8:
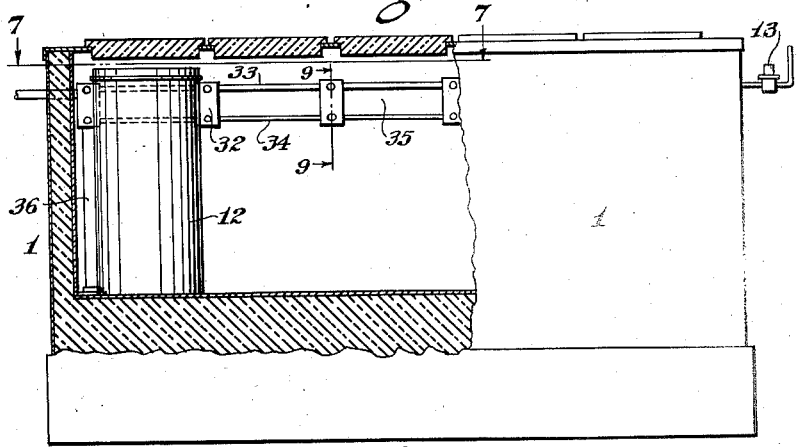
Fig. 8 is an elevation partly in section on the line 8—8 of Fig. 7.
Figure 9:
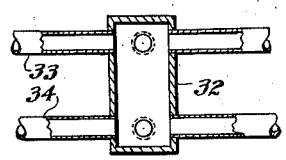
Fig. 9 is a section on the line 9—9 of Fig. 8.

Figs. 7, 8 and 9 show a construction in which the refrigerant circulation means is materially simplified, but related to the upper end portions of the receivers 12 so as to effect the required temperature in the entire mass of frozen products therein. In this form of construction I provide a series of vertical holders 32 closed at their upper and lower ends and having pipe connections 33 between their upper end portions and pipe connections 34 between their lower end portions, the pipes and holders being connected in any suitable manner, preferably by welding. As shown in Figs. 7 and 8, the holders 32 and pipes 33, 34, are so arranged with respect to each other that they form spaces into which the receivers may be removably positioned. If desired, each pipe 33 and adjacent pipe 34 may support a web 35 of sheet metal having high heat conductivity to increase the transfer of heat (see Fig. 10). The circulation means may be formed in sections, if desired. The pipes 33, 34, and holders 32 form a unitary structure and removably fit within the cabinet 1, being supported on suitable legs 36.

Figure 10:
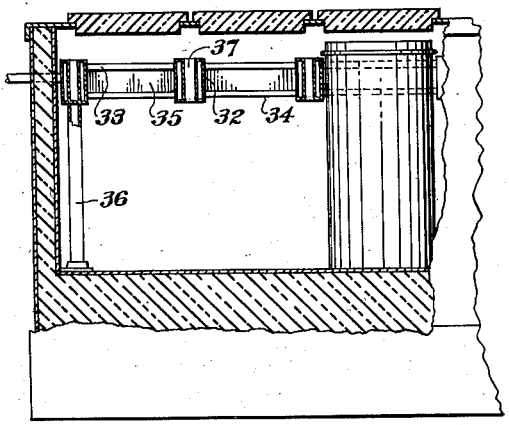
Fig. 10 is a fragmentary view showing another form of construction.

In the form of construction shown in Fig. 10, the holders are provided with inner cylindrical members 37, of somewhat smaller diameter than the holders 32 so as to form within the latter annular circulation spaces, each such space being closed at its upper and lower ends by rings, which may be welded to the ends of the holders and cylinders. In this form of construction the cylinders 37 are open at their opposite ends so that their side walls are exposed and thereby provide increased refrigerated wall surfaces. It will be noted that in the forms of construction herein shown, the arrangement of the circulation means provides a space therebelow between the receivers 12, which space may be utilized for the storage of foods and food products, for example, packaged frozen products.

To those skilled in the art to which my invention relates, many changes in construction and widely differing embodiments and applications of the invention will suggest themselves without departing from the spirit and scope of the invention. My disclosures and the description herein are purely illustrative and not intended to be in any sense limiting.

What I claim is:

1. In apparatus of the class described, the combination of an insulated casing forming an elongated chamber adapted to contain rows of containers filled with refrigerated products, a circulation means for a volatile liquid refrigerant in said chamber disposed in relation to the upper end portions of said containers and spaced from the bottom of said chamber, a supply connection into said circulation means for the liquid refrigerant, means for controlling the supply of the liquid refrigerant through said connection, and an outlet from said circulation means.

2. In apparatus of the class described, the combination of an insulated casing forming a chamber adapted to contain containers filled with refrigerated products, a circulation means for a volatile liquid refrigerant in said chamber and comprising the manifold disposed horizontally in spaced relation to the bottom of said chamber in heat transfer relation to the upper ends of the containers and formed with openings in which the containers are removably positioned, a supply connection to said means for the liquid refrigerant and an outlet leading from said circulation means.

3. In apparatus of the class described, the combination of an insulated casing forming a chamber adapted to contain containers filled with refrigerated products, a circulation means for a volatile liquid refrigerant in said chamber and comprising a plurality of longitudinally extending spaced circulation members between which the containers are removably positioned, said members being spaced from the bottom of said chamber in heat transfer relation to the upper ends of the containers, whereby the lower portions of the latter are exposed to the atmosphere in said chamber, liquid connections between said members, a supply connection to said means for the liquid refrigerant and an outlet leading from said circulation means.

4. In apparatus of the class described, the combination of an insulated casing forming a chamber adapted to contain containers filled with refrigerated products, a circulation means for a volatile liquid refrigerant in said chamber and comprising a plurality of spaced holders between which the containers are removably positioned, horizontally disposed, longitudinally extending liquid connections between said holders and horizontally disposed, transversely extending liquid connections between said holders, said holders and connections being spaced from the bottom of said chamber in heat transfer relation to the upper ends of the containers, a supply connection to said means for the liquid refrigerant and an outlet leading from said circulation means.

5. In apparatus of the class described, the combination of an insulated casing forming a chamber adapted to contain containers filled with refrigerated products, a circulation means for a volatile liquid refrigerant in said chamber and comprising a plurality of spaced holders between which the containers are removably positioned, and horizontally disposed, longitudinally extending liquid connections between said holders, each said holder consisting of an inner and an outer member forming an annular circulating chamber between them closed at its ends and said inner member being open at one end, a supply connection to said means for the liquid refrigerant and an outlet leading from said circulation means.

6. In apparatus of the class described, the combination of an insulated casing having a bottom and sides forming a chamber, a manifold in said chamber disposed horizontally between its sides in spaced relation to the bottom of said chamber, a supply connection into said manifold for a liquid refrigerant, means for controlling the supply of the liquid through said connection, and an outlet from said manifold, said manifold being formed with an opening through it to receive a container having a frozen product therein.

7. In apparatus of the class described, the combination of an insulated casing having a bottom and sides forming a chamber, a manifold in said chamber disposed horizontally between its sides in spaced relation to the bottom of said chamber, a supply connection into said manifold for a liquid refrigerant, an outlet from said manifold, and means for controlling the supply of the liquid through said connection for maintaining a substantially predetermined supply of the liquid in said manifold, said manifold being formed with an opening through it to receive a container having a frozen product therein.

8. In apparatus of the class described, the combination of a casing having a bottom, insulated side walls and end walls and a top forming a chamber adapted to receive containers filled with materials to be dispensed, one of said walls being thickened and enclosing a freezing mechanism having a refrigerant chamber, circulation means in said chamber disposed above the bottom thereof in relation to the upper ends of said containers in said casing, a supply connection for a liquid having a low boiling point leading into said circulation means, means for controlling the supply of the liquid through said connection, an outlet from said circulation means, separate connections leading through said thickened wall for connecting said refrigerant chamber and said circulation means, and control means in one of said connections.

9. In apparatus of the class described, the combination of a casing having a bottom, side walls and end walls, forming a chamber, one of said walls being formed of insulation material, a manifold disposed horizontally in the upper portion of said chamber and formed with an opening through it to receive a container having a frozen product therein, a freezing mechanism comprising an inner cylinder for a mix and an outer cylinder forming with said inner cylinder a refrigerant space, said outer cylinder being embedded in and surrounded by said insulation material, a supply connection into said manifold for a liquid refrigerant, means for controlling the supply of the liquid through said connection, an outlet from said manifold, separate connections between said chamber and said manifold, leading through said insulation material, and a valve in one of the last mentioned connections.

10. In apparatus of the class described, the combination of a casing having a bottom, insulated side walls and end walls, one of said walls being thickened, a freezing mechanism having a refrigerant chamber embedded in and surrounded by the insulation of said thickened wall, a manifold in said casing, a supply connection into said manifold for a refrigerant, means for controlling the supply of the liquid through said connection, an outlet from said manifold, said manifold being formed with an opening through it to receive a container having a frozen product therein, a liquid connection leading through the insulation of said thickened wall between the bottom of said chamber and said manifold, a connection leading through the insulation of said thickened wall between the upper portion of said chamber and said manifold, and control means in the last mentioned connection.

11. In apparatus of the class described, the combination of an insulated casing having a bottom and sides forming a chamber for a container containing a frozen product adapted to set on said bottom, a manifold disposed horizontally in said chamber above the bottom thereof, a supply connection into said manifold for a liquid refrigerant, means for controlling the supply of liquid through said connection, an outlet from said manifold, said manifold being formed with an opening through which the upper end of the container extends, and a conducting wall depending from said manifold in relation to the side wall of the container and terminating at a point remote from the bottom of said casing.

12. An apparatus as claimed in claim 11 in which the conducting wall surrounds the container in spaced relation thereto.

13. In apparatus of the class described, the combination of an insulated casing having a bottom and sides forming a chamber, a closed manifold in said chamber adapted to hold a volatile liquid refrigerant, said manifold being horizontally disposed within the sides of said chamber in spaced relation to the bottom thereof, a supply connection into said manifold for the refrigerating liquid, means for controlling the supply of the liquid through said connection, an outlet from said manifold, said chamber being adapted to receive containers containing frozen material and said manifold being formed with a plurality of openings through which the upper ends of the containers extend, and an annular conducting wall depending from said manifold in concentric relation to each opening therein, said walls terminating at a point remote from the bottom of said casing.

14. An apparatus as claimed in claim 13 in which each conducting wall surrounds a portion of a container in spaced relation thereto.

15. In a storing apparatus for frozen materials, the combination of a casing having a bottom and insulated sides forming a chamber in which filled containers are adapted to be stored in side by side relation, refrigerating means disposed in heat transfer relation to the upper ends of said containers whereby the lower portions thereof are exposed to the atmosphere in said chamber, said means comprising conduits for a volatile liquid refrigerant extending from end to end of said chamber, a supply means for the refrigerant, and an outlet for generated gases.

16. In apparatus of the class described, the combination of an insulated casing having a bottom and sides forming a chamber in which filled containers are adapted to be stored, a closed manifold in said chamber and adapted to hold a volatile liquid refrigerant, a connection for supplying the refrigerant to said manifold, means for controlling the refrigerant supply through said connection, an outlet from said manifold, said manifold being disposed horizontally and in spaced relation to the bottom of said chamber to provide an open space below said manifold around said containers, said manifold being formed with openings through which the upper ends of the containers extend, and a conducting wall depending from said manifold in relation to the side wall of each container.

MICHAEL H. ACKERMAN.